(12) United States Patent
Shin et al.

(10) Patent No.: US 8,486,330 B2
(45) Date of Patent: Jul. 16, 2013

(54) ZR-TI-NI (CU) BASED BRAZING FILLER ALLOY COMPOSITIONS WITH LOWER MELTING POINT FOR THE BRAZING OF TITANIUM ALLOYS

(75) Inventors: Seung-Yong Shin, Incheon (KR); Dong-Myoung Lee, Pyeongtaek-si (KR); Ju-Hyun Sun, Incheon (KR); Yong-Hwan Kim, Incheon (KR); Dong-Han Kang, Incheon (KR)

(73) Assignees: Korea Institute of Industrial Technology (KR); Yosan Eng. Ltd. (KR)

( * ) Notice: Subject to any disclaimer, the term of this patent is extended or adjusted under 35 U.S.C. 154(b) by 515 days.

(21) Appl. No.: 12/672,675

(22) PCT Filed: Aug. 7, 2008

(86) PCT No.: PCT/KR2008/004606
§ 371 (c)(1),
(2), (4) Date: May 14, 2010

(87) PCT Pub. No.: WO2009/020364
PCT Pub. Date: Feb. 12, 2009

(65) Prior Publication Data
US 2011/0211987 A1    Sep. 1, 2011

(30) Foreign Application Priority Data
Aug. 7, 2007    (KR) .................. 10-2007-0079148

(51) Int. Cl.
*C22C 16/00*    (2006.01)
(52) U.S. Cl.
USPC ............ 420/423; 420/422; 420/580; 148/421
(58) Field of Classification Search
USPC .................. 148/403, 421, 528; 420/422, 423, 420/580
See application file for complete search history.

(56) References Cited

U.S. PATENT DOCUMENTS

| 4,148,669 A | 4/1979 | Tanner et al. |
| 5,334,344 A | 8/1994 | Hegner et al. |

(Continued)

FOREIGN PATENT DOCUMENTS

| JP | 2687976 B2 | 12/1997 |
| JP | 11-40583 A | 2/1999 |
| WO | 2006-068948 A1 | 6/2006 |

OTHER PUBLICATIONS

Wang et al., "Formations of amorphous and quasicrystal phases in Ti-Zr-Ni-Cu alloys," Journal of Alloys and Compounds, 361, (2003), pp. 234-240.*

(Continued)

*Primary Examiner* — Scott Kastler
*Assistant Examiner* — Vanessa Luk
(74) *Attorney, Agent, or Firm* — Knobbe Martens Olson & Bear, LLP

(57) ABSTRACT

Disclosed is Zr—Ti—Ni(Cu)-based filler alloy composition having low melting point for brazing titanium and titanium alloys. The Zr—Ti—Ni(Cu)-based alloy composition is expressed as: $Zr_a Ti_b Ni_c$ (Formula 1) where a, b and c denote atomic % of Zr, Ti and Ni, respectively; $47 \leq a \leq 52$; $24 \leq b \leq 30$; $22 \leq c \leq 26$; and $0.3 < c/(a+c) < 0.35$, or $Zr_a Ti_b Ni_c Cu_d$ (Formula 2) where a, b, c and d denote atomic % of Zr, Ti, Ni and Cu respectively; $48 \leq a \leq 60$; $20 \leq b \leq 28$; $19 \leq c+d \leq 30$; $3 \leq d \leq 12$; and $0.12 < d/(c+d) \leq 0.5$. Including Zr(Ti) solid solution phase as its major constituent phase, the alloy compositions of this invention have lower liquidus temperature than those of conventional alloys and they include a little amount of Cu or does not include it at all. When alloy of the present invention is used as filler alloy for brazing titanium and titanium alloys, brazing can be performed at remarkably low temperature. This prevents the microstructure of titanium base metal from changing and being damaged, keeping the titanium base metal preserving inherent properties after brazing.

3 Claims, 11 Drawing Sheets

U.S. PATENT DOCUMENTS 6,149,051 A    11/2000  Vollmer et al.
7,131,569 B2*  11/2006  Matsu .......................... 228/183

OTHER PUBLICATIONS

Majzoub et al., "Rietveld refinement and ab initio calculations of a C14-like Laves phase in Ti-Zr-Ni," Philosophical Magazine Letters, 839(1), (2003), pp. 65-71.*
Kelton et al., "First X-Ray Scattering Studies on Electrostatically Levitated Metallic Liquids: Demonstrated Influence of Local Icosahedral Order on the Nucleation Barrier," Physical Review Letters, 90(19), (2003), pp. 195504-1 to 195504-4.*
Qiang et al., "Quasicrystals in the Ti-Zr-Ni alloy system," Journal of Non-Crystalline Solids, 334-335, (2004), pp. 223-227.*
Publication information of Qiang et al., "Formation of e/a-constant phases in the Ti-Zr-Ni-Cu system," Materials Science and Engineering A, 449-451, (2007), pp. 565-568, published online on Sept. 20, 2006.*
Onzawa Tadao et al., Development of Titanium-Based Brazing Filler Metals with Low-Melting-Point, Journal of High Pressure Institute of Japan, 2002, vol. 40., No. 1, pp. 18-27.
E. Chang and C.H. Chen, Low-Melting-Point Titanium-Base Brazing Alloys-Part 1: Characteristics of Two-, Three-, and Four-Component Filler Metals, Journal of Materials Engineering and Performance, Dec. 1997, vol. 6, pp. 792-796.
Botstein et al, Induction brazing of Ti-6A1-4V alloy with amorphous 25Ti-25Zr-50Cu brazing filler metal, Materials Science and Engineering, 1996, vol. A206, pp. 14-23.
Chang et al., Low-Melting-Point Titanium-Base Brazing Alloys-Part 2: Characteristics of Brazing Ti-21Ni-14Cu on Ti-6Al-4V Substrate, Journal of Materials Engineering and Performance, Dec. 1997, vol. 6(6), pp. 797-803.
International Search Report dated Jan. 20, 2009 of corresponding PCT Application No. PCT/KR2008/004606 filed on Aug. 7, 2008—2 pages.
Qiang, et al. "Formation of ela-constant phases in the Ti-Zr-Ni-Cu system". Materials Science and Engineering A 449-451 (2007) pp. 565-568.
Gupta, K.P., "The Ni-Ti-Zr System (Nickel-Titanium-Zirconium)," Journal of Phase Equilibria, vol. 20, No. 4, 1999, pp. 441-448.
Qiang et al., "Ti-Zr-Ni bulk quasicrystals prepared by casting," Philosophical Magazine Letters, vol. 83, No. 7, 2003, pp. 467-472.
Shapiro, et al., "State of the Art of Titanium-Based Brazing Filler Metals," Welding Journal, Oct. 2003, pp. 36-43.

* cited by examiner

FIG. 7
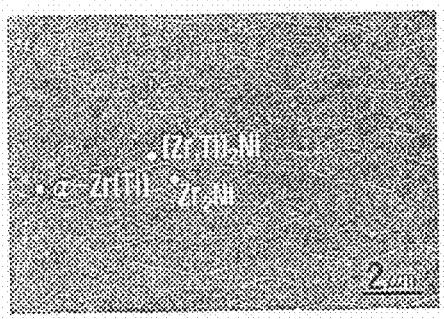
(a) Microstructure of $Zr_{50}Ti_{26}Ni_{24}$ alloy
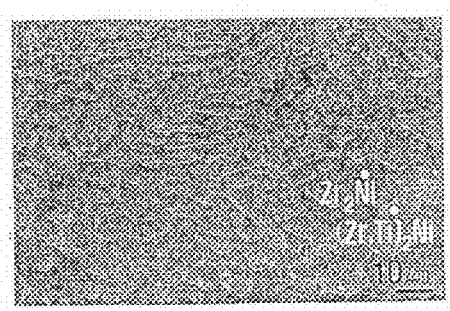
(b) Microstructure of $Zr_{43.9}Ti_{22.8}Ni_{33.3}$ alloy

ZR-TI-NI (CU) BASED BRAZING FILLER ALLOY COMPOSITIONS WITH LOWER MELTING POINT FOR THE BRAZING OF TITANIUM ALLOYS

TECHNICAL FIELD

The present invention relates to a filler alloy composition for brazing titanium which has a low melting point; and, more particularly, in case of brazing of Ti, Ti alloys or dissimilar materials including titanium or titanium alloy, brazing with this alloy can provide a robust joint body and preserve mechanical properties of titanium base metal after brazing process.

BACKGROUND ART

Many filler alloys have been developed and researched for brazing titanium and titanium alloy. The developed Filler alloys are largely divided into four groups: aluminum (Al)-based filler alloy, silver (Ag)-based filler alloy, titanium (Ti)-based filler alloy, and zirconium (Zr)-based filler alloy. In case of using the Al-based filler alloy and Ag-based filler alloy, a detrimental intermetallic compound phase is formed by reactions between the major elements comprising the filler metals and Ti base alloys in Ti brazed joint area. Thus, they are improper for the formation of a robust Ti joint body which requires heat-resistance, corrosion resistance, strength and reliability. On the contrary, active-element based filler alloys, containing large amount of active elements such as Ti and Zr element have been well known to provide a good Ti brazed joint body having excellent heat-resistance corrosion resistance and strength at room temperature and high temperature. However, since the active element-based filler alloys have relatively high melting points, their brazing temperature can be close to the recrystallization temperature and beta transus temperature of titanium base metals to be joined. So the microstructure of Ti base metal may be altered if the brazing temperature exceeds these restrictive temperatures. Eventually, the change of original microstructure of Ti-based alloy after brazing causes the mechanical properties of base metal to be impaired.

When brazing ($\alpha+\beta$) type and $\beta$ type Ti alloys, there has been actual restriction in selecting a brazing cycle and a filler alloy with a low melting point that can allow heat-treated ($\alpha+\beta$) type and $\beta$ type Ti alloys to braze without changing their heated structure. Theoretically, it is desirable that Ti-based alloy should be brazed at a temperature as lower as from 55 to 83° C. than its beta transus temperature. If Ti alloy is brazed at a temperature higher than the restrictive temperatures, the mechanical properties such as strength and ductility particular in the $\alpha+\beta$ type and $\beta$ type Ti alloys heat-treated may be impaired. The damaged mechanical properties of Ti base metals are hard to be recovered without another heat treatment for the brazed assembly. After brazing, the re-heat treatment of brazed part such as quenching may deform the brazed assembly in large size with complicated shape due to the rapid change in the temperature. Therefore, post heat treatment of the brazed assembly after brazing is not preferable to solve this problem.

In order to reduce the impairment of Ti base metal after brazing, using filler alloy with low melting point has been preferable as an effective method. With the active element based filler alloys developed, their brazing temperature has to be set at temperature more than 850° C. This is because a conventional filler alloy having the lowest melting point has a liquidus temperature of approximately 843° C. at Ti-37.5Zr-15Cu-10Ni in wt % ($Ti_{48.5}Zr_{25.7}Cu_{14.8}Ni_{10.6}$ in atomic %). In case of beryllium (Be) containing active brazing filler alloys such as Zr—Ti—Ni—Be have a liquidus temperature less than 800° C. because Be element is a strong melting point depressant of Ti and Zr. However, the use of Zr—Ti—Ni—Be has been restricted since Be is a hazardous element. Also, another Zr-based filler alloy in free of Be, which is Zr-11Ti-14Ni-13Cu (wt %) ($Zr_{50.3}Ti_{17.0}Cu_{15.1}Ni_{17.6}$ in atomic %), has a liquidus temperature about at 830° C. Even though its liquidus temperature is lower than that of other Ti-based filler alloys by approximately 20~30° C., but it has a drawback that brazing should be performed at a high temperature more than 900° C.

Also, conventional filler alloys taking an active element, e.g., Ti or Zr, as a base includes copper (Cu) and/or nickel (Ni) more than 14% by atomic ratio as a melting point depressant. Herein, although Cu is effective in drastically dropping the melting point of an alloy in the presence of Ni, it has a shortcoming that it also deteriorates mechanical and chemical properties of the brazing joint body when it is included abundantly. In short, Cu causes a brittle intermetallic compound to be generated easily during a joining process and a process of cooling a joint body.

According to a study by Botztein et al published in *Materials Science and Engineering A*, Vol. 206, pp. 14-23, 1995, when a Ti alloy is brazed using a Cu—Ti—Zr filler alloy, a brittle $\lambda$-$Cu_2TiZr$ Lavas phase appears during slow cooling process. To prevent the formation of the brittle phase, it is recommended to limit the Cu concentration in the joint body to go not more than approximately 10 wt % to approximately 12 wt %.

Also, a study by Chang et al published in *Journal of Materials Engineering and Performance*, Vol. 6(6), pp. 797-803, 1997, reveals that when Ti-6Al-4V is joined at approximately 960° C. using Ti-21Ni-14Cu molten filler in a joint body reacts with an ($\alpha+\beta$)-type Ti-based alloy to thereby form a lamellar-type Widmanstatten structure consisting of a $Ti_2Ni$ phase and a $Ti_2Cu$ phase. Herein, the $Ti_2Ni$ phase disappears as Ni component existing on a joint body in the initial state diffuses into the inside of a base metal during a 2-hour-long diffusion process. On the other hand, the $Ti_2Cu$ phase still remains on the joint body.

In consequences, the high melting temperature of conventional filler alloys and a high content of Cu have been pointed out as factors degrading durability of a Ti-brazed assembly. Therefore, when Ti alloy is brazed using typical filler alloy, a short brazing cycle is needed in order to protect base metal from being mechanically damaged. To be specific, the Ti alloy should be heated up to quickly reach as high brazing temperature as approximately 850° C. and up, maintained at the brazing temperature for a short time no longer than approximately 15 minutes, and quenched rapidly. The short brazing cycle may be disadvantageous when a metal like Ti having heat conductivity lower than other metals is used for a joint body.

To sum up, it is necessary to limit the amount of Cu added to a filler alloy to a minimum amount in developing new active element-based filler alloy having a low melting point.

DISCLOSURE

Technical Problem

An embodiment of the present invention devised to overcome the above problems is directed to providing a filler alloy composition having a low melting point that can be brazed at a temperature lower than conventional brazing temperature to preserve mechanical properties of a Ti-based metal during a heat cycle and form a robust joint body, when Ti, Ti alloy or dissimilar material joining including Ti or Ti alloy is brazed to be assembled.

Particularly, an embodiment of the present invention is directed to providing a filler alloy composition which does not include an element hazardous to a human body, such as Be, has a melting point much lower than typical active element-based filler alloy so that brazing can be performed at a temperature lower than approximately 800° C., and includes Cu element, which may degrade mechanical and chemical properties of a joint body, within a range of approximately 12 atomic % or does not include Cu at all.

Technical Solution

In accordance with an aspect of the present invention, there is provided a Zr—Ti—Ni ternary alloy composition, expressed as:

$$Zr_a Ti_b Ni_c \qquad \text{Formula 1}$$

where a, b and c denote atomic % of Zr, Ti and Ni, respectively; $47 \leq a \leq 52$; $24 \leq b \leq 30$; $22 \leq c \leq 26$; and $0.3 < c/(a+c) < 0.35$.

In accordance with another aspect of the present invention, there is provided a Zr—Ti—Ni—Cu quaternary alloy composition, expressed as:

$$Zr_a Ti_b Ni_c Cu_d \qquad \text{Formula 2}$$

where a, b, c and d denote atomic % of Zr, Ti, Ni and Cu respectively; $48 \leq a \leq 60$; $20 \leq b \leq 28$; $19 \leq c+d \leq 30$; $3 \leq d \leq 12$; and $0.12 < d/(c+d)$ $0.5$.

Advantageous Effects

The Zr—Ti—Ni ternary filer alloy compositions have a constituent phase of Zr(Ti) solid solution phase, $(Zr,Ti)_2Ni$ phase, and $Zr_2Ni$ phase at room temperature after slow solidification, and the filler alloys can have low melting temperature ranging approximately 797° C. to approximately 825° C. upon heating through eutectic reaction between the phases. Also, the Zr—Ti—Ni—Cu quaternary filer alloy compositions have a constituent phase of Zr(Ti) solid solution phase with Cu dissolved therein, $(Zr,Ti)_2Ni$ phase with Cu dissolved therein, and $Zr_2Ni$ phase with Cu dissolved therein at room temperature, or it may have a constituent phase of Zr(Ti) solid solution phase with Cu dissolved therein, $(Zr,Ti)_2Ni$ phase with Cu dissolved therein, and $Zr_2Cu$ phase with Ni dissolved therein to thereby have a low melting point not higher than approximately 772° C. to approximately 809° C. Furthermore, the total Cu content in the Zr—Ti—Ni—Cu quaternary filer alloy composition ranges from approximately 3 atomic % to approximately 12 atomic %, and the amount of Cu in the Ni+Cu obtained by aggregating the Ni content and the Cu content does not exceed approximately 50 atomic %. In short, the Ni content is equal to or greater than the Cu content.

Therefore, the filler alloy compositions of the present invention have a lower brazing temperature than those of conventional filler alloys, it can be brazed at a temperature not higher than approximately 800° C. and thus it can minimize the damage on the mechanical properties of Ti-based alloy caused by phase change or grain growth of the Ti-based metal. In short, the use of the filler alloy composition of the present invention having a low melting point can minimize the extent of degradation in the strength of Ti base metal caused by a brazing heat cycle and maximize joining strength.

BRIEF DESCRIPTION OF THE DRAWINGS

FIG. 7 shows scanning electron microscopic (SEM) images showing $Zr_{50}Ti_{26}Ni_{24}$ alloy composition prepared according to Example 6 and $Zr_{43.9}Ti_{22.8}Ni_{33.3}$ alloy composition prepared according to Comparative Example 8, respectively, according to Experimental Example 2.

BEST MODE FOR THE INVENTION

Zr—Ti—Ni ternary alloy composition of the present invention is expressed as the following Formula 1:

$$Zr_a Ti_b Ni_c \qquad \text{Formula 1}$$

where a, b and c denote atomic % of Zr, Ti and Ni respectively; and $47 \leq a \leq 52$, $24 \leq b \leq 30$, $22 \leq c \leq 26$, and $0.3 < c/(a+c) < 0.35$.

Figure 1:
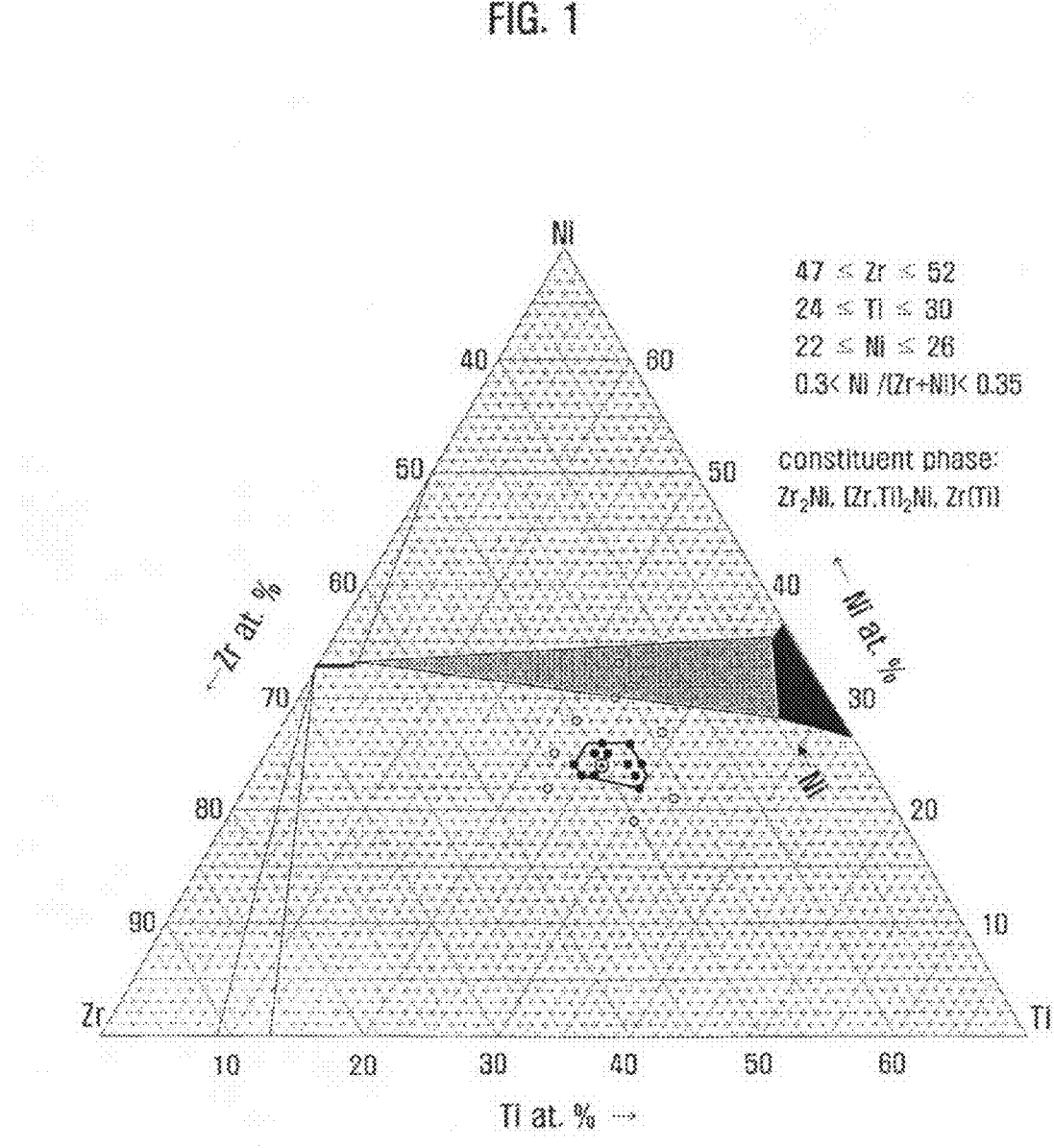
FIG. 1 shows a composition range of a Zr—Ti—Ni ternary alloy composition in accordance with an embodiment of the present invention.

FIG. 1 shows a composition range of a Zr—Ti—Ni ternary alloy composition in accordance with an embodiment of the present invention.

Also, Zr—Ti—Ni—Cu quaternary alloy composition of the present invention is expressed as the following Formula 2:

$$Zr_a Ti_b Ni_c Cu_d \qquad \text{Formula 2}$$

where a, b, c and d denote atomic % of Zr, Ti, Ni and Cu, respectively; and $48 \leq a \leq 60$, $20 \leq b \leq 28$, and $19 \leq c+d \leq 30$, $3 \leq d \leq 12$, and $0.12 < d/(c+d) \leq 0.5$.

Figure 2:
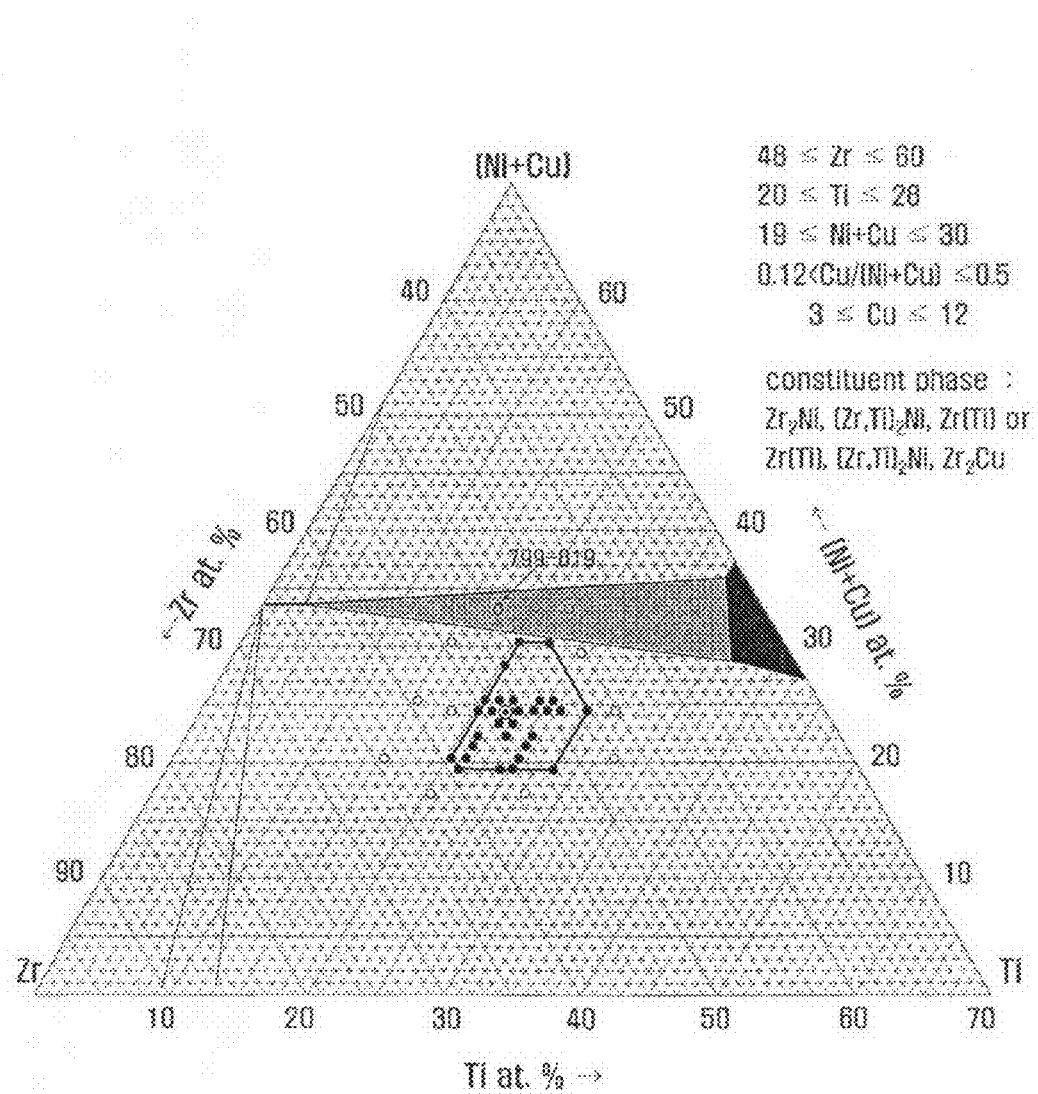
FIG. 2 shows a composition range of a Zr—Ti—Ni—Cu quaternary alloy composition in accordance with an embodiment of the present invention.

FIG. 2 shows a composition range of a Zr—Ti—Ni—Cu quaternary alloy composition in accordance with an embodiment of the present invention.

Figure 5:
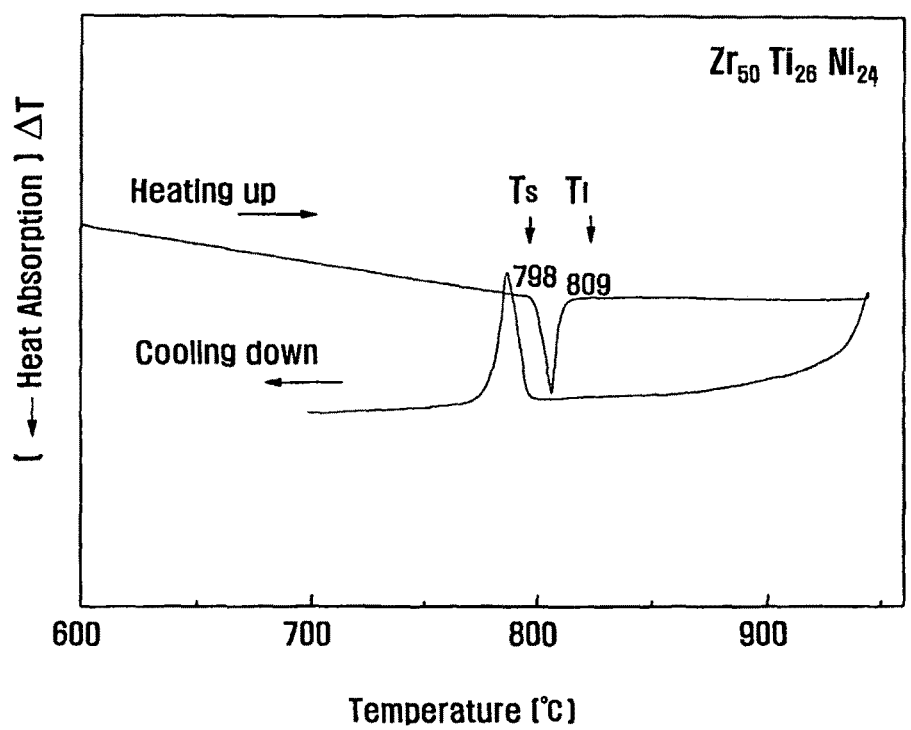
FIG. 5 is a DTA curve of $Zr_{50}Ti_{26}Ni_{24}$ alloy composition of Example 6 according to a first Experimental Example during heating and cooling processes.
Figure 6:
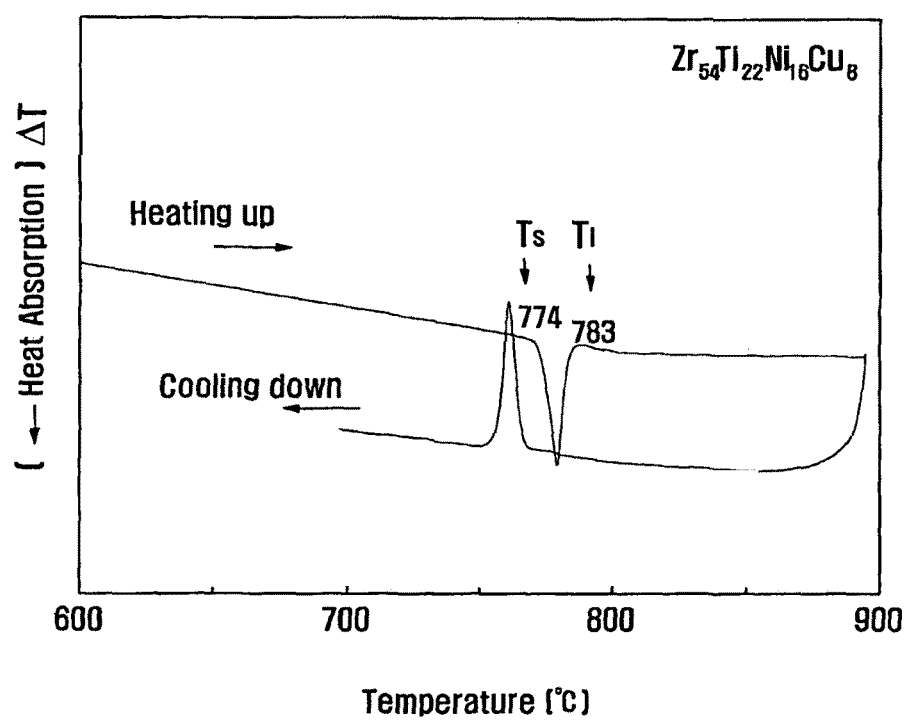
FIG. 6 is a DTA curve of $Zr_{54}Ti_{22}Ni_{16}Cu_8$ alloy composition of Example 39 according to a third Experimental Example during heating and cooling processes.

As shown in FIGS. 5 and 6, Zr—Ti—Ni ternary composition or Zr—Ti—Ni—Cu quaternary alloy composition of the present invention goes through melting and solidification in a narrow temperature range during heating and cooling. To be specific, the Zr—Ti—Ni ternary alloy composition of the present invention has a solidus temperature lower than approximately 800° C. Specifically, the solidus temperature ranges from approximately 797° C. to approximately 798° C. The liquidus temperature is not higher than approximately 825° C. At the liquidus approximately, melting is completed. Specifically, the liquidus temperature ranges from approximately 809° C. to approximately 825° C. Also, the Zr—Ti—Ni—Cu quaternary alloy of the present invention has a solidus temperature lower than approximately 800° C. Specifically, the solidus temperature ranges from approximately 772° C. to approximately 792° C. The liquidus temperature is not higher than 809° C. Specifically, the liquidus temperature ranges from approximately 783° C. to approximately 809° C. As described above, the ternary and quaternary alloy compositions of the present invention have a narrow melting temperature range and a low melting point.

The low melting point is a characteristic of the Zr—Ti—Ni ternary alloy or Zr—Ti—Ni—Cu quaternary alloy suggested in the present invention and originates from a eutectic reaction among constituent phases constituting the composition.

Figure 3:
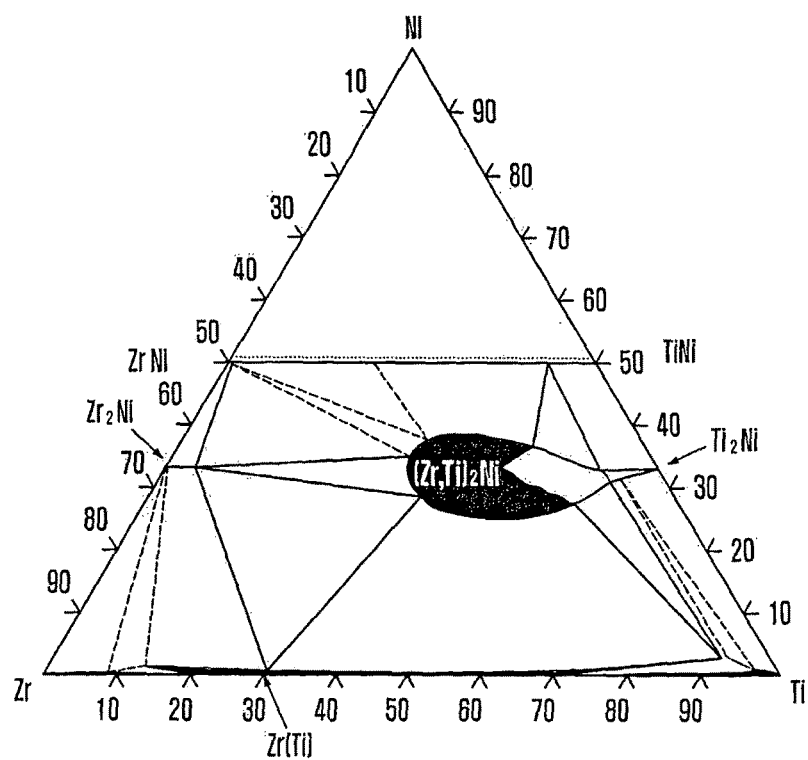
FIG. 3 is a ternary phase diagram of Zr—Ti—Ni system at 700° C.
Figure 4:
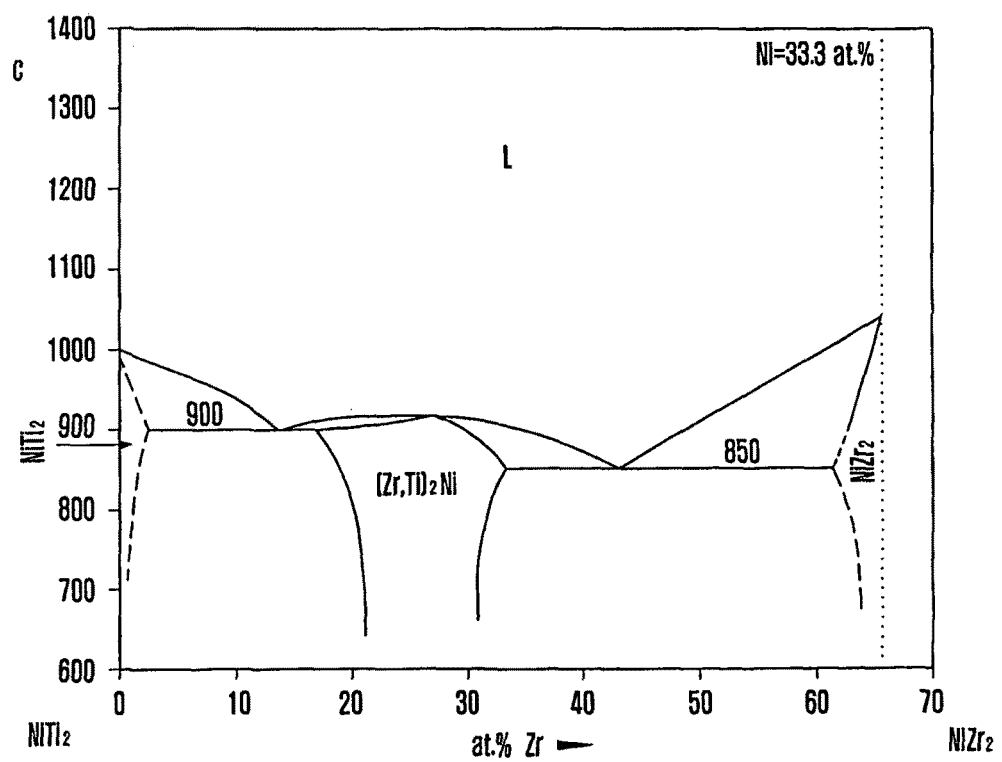
FIG. 4 is a pseudo binary $Zr_2Ni$—$Ti_2Ni$ phase diagram.

As shown in FIGS. 3 and 4, when a Zr—Ti—Ni ternary alloy contains Ni in a uniform content of approximately 33.3 at %, the constituent phase in the Zr-rich region includes $Zr_2Ni$ phase and $(Zr,Ti)_2Ni$ phase, and it is known that there is a pseudo binary eutectic point of $Zr_2Ni$—$(Zr,Ti)_2Ni$ of approximately 850° C. based on a eutectic reaction between the two phases.

The present invention in a Zr-based Zr—Ti—Ni alloy limits the Ni content to less than approximately 30 at %, specifically, to approximately 22 at % to approximately 26 at % to thereby form Zr solid solution phase as a new constituent phase other than the two phases. In short, as shown in FIG. 3, the ternary alloy composition range of the present invention is formed in an inverse triangle region including three types of phases: $Zr_2Ni$ phase (body-centered tetragonal, bct), $(Zr,Ti)_2Ni$ phase (hexagonal close-packed, hcp), and $Zr(Ti)$ solid solution phase (hcp). A eutectic system including the three types of constituent phases comes to have a eutectic temperature lower than the eutectic temperature of the pseudo binary eutectic system and thus it is understood that the ternary alloy composition of the present invention comes to have the lower melting temperature. To be specific, the ternary alloy composition of the present invention can have a low melting temperature ranging from approximately 797° C. to approximately 825° C. through a eutectic reaction of $Zr_2Ni+(Zr,Ti)_2Ni+Zr(Ti) \rightarrow L$ during heating. Thus, it is understood that the ternary eutectic system of the present invention appears by reducing the content of Ni by less than approximately 30 at % from the composition of the pseudo binary eutectic system.

The present invention also provides a quaternary alloy composition obtained by adding Cu to the Zr—Ti—Ni ternary alloy as a melting point depressant and limiting the Cu content to approximately 3 at % to 12 at %. The quaternary alloy of the present invention can have solidus and liquidus temperature lower than the ternary alloy composition by substituting part of Ni of the ternary alloy composition with Cu, that is, by adding Cu in an amount less than or equal to the amount of the remaining Ni (Ni content≧Cu content). To be specific, the quaternary alloy composition of the present invention has a melting point as low as approximately 772° C. to approximately 809° C. through a eutectic reaction. The quaternary alloy composition can have a wider composition range including the ternary eutectic points although the liquidus temperature of the quaternary composition is lower than that of the ternary alloy composition.

Furthermore, the alloy composition of the present invention has a characteristic that it tends to easily form glassy phase (amorphous structure) without crystallization. The characteristic is so-called glass forming ability (GFA). Thus, it can be prepared as amorphous foil having a thin film shape through a rapid solidification method, e.g., melt-spinning. The amorphous foil is not fragile, differently from a crystallized structure. Moreover, it is mechanically flexible and its thickness can be controlled as thin as approximately 20 μm to approximately 80 μm. In Ti brazing, the thickness of filler foil controls the supply amount of filler metal, which decides the size of joint clearance. If the joint clearance is greater than a certain size, fragile inter-metal chemical compound is formed at the center of a brazing zone, which may lead to adverse influence on joint integrity. Therefore, it is advantageous to have the alloy composition a glass forming ability and form it in a thin film-shaped amorphous foil.

Hereafter, specific embodiments of the present invention will be described in detail. The following Examples are not restrictive but illustrative only.

EMBODIMENTS

Examples 1 to 12

Zr—Ti—Ni Ternary Alloy

The following Table 1 shows Zr—Ti—Ni ternary alloy compositions prepared according to Examples 1 to 12 and Comparative Examples 1 to 8, constituent phases identified through X-ray diffraction analysis, and solidus temperature and liquidus temperature obtained through differential thermal analysis.

TABLE 1

| Examples | Composition (at. %) | | | Constituent Phase | | | Solidus Temperature ($T_s$, °C.) | Liquidus Temperature ($T_l$, °C.) |
|---|---|---|---|---|---|---|---|---|
| | Zr | Ti | Ni | $Zr_2Ni$ | $(Zr,Ti)_2Ni$ | $Zr(Ti)$ | | |
| Example 1 | 48 | 30 | 22 | √ | √ | √ | 798 | 813 |
| Example 2 | 52 | 25 | 23 | √ | √ | √ | 798 | 815 |
| Example 3 | 51 | 26 | 23 | √ | √ | √ | 798 | 809 |
| Example 4 | 48 | 29 | 23 | √ | √ | √ | 798 | 812 |
| Example 5 | 52 | 24 | 24 | √ | √ | √ | 798 | 811 |
| Example 6 | 50 | 26 | 24 | √ | √ | √ | 798 | 809 |
| Example 7 | 48 | 28 | 24 | √ | √ | √ | 798 | 815 |
| Example 8 | 47 | 29 | 24 | √ | √ | √ | 798 | 818 |
| Example 9 | 50 | 25 | 25 | √ | √ | √ | 798 | 820 |
| Example 10 | 49 | 26 | 25 | √ | √ | √ | 797 | 817 |
| Example 11 | 47 | 27 | 26 | √ | √ | √ | 798 | 825 |
| Example 12 | 49 | 25 | 26 | √ | √ | √ | 797 | 825 |

TABLE 1-continued

| Examples | Composition (at. %) Zr | Ti | Ni | Constituent Phase $Zr_2Ni$ | $(Zr,Ti)_2Ni$ | $Zr(Ti)$ | Solidus Temperature $(T_s, °C.)$ | Liquidus Temperature $(T_l, °C.)$ |
|---|---|---|---|---|---|---|---|---|
| Comparative Example 1 | 50 | 31 | 19 | √ | √ | √ | 796 | 850 |
| Comparative Example 2 | 46 | 33 | 21 | √ | √ | √ | 799 | 845 |
| Comparative Example 3 | 55 | 23 | 22 | √ | √ | √ | 798 | 842 |
| Comparative Example 4 | 53 | 22 | 25 | √ | √ | √ | 798 | 846 |
| Comparative Example 5 | 44 | 29 | 27 | √ | √ | √ | 798 | 847 |
| Comparative Example 6 | 45 | 22 | 28 | √ | √ | √ | 798 | 849 |
| Comparative Example 7 | 46 | 24 | 30 | √ | √ | √ | 798 | 858 |
| Comparative Example 8 | 43.9 | 22.8 | 33.3 | √ | √ | — | 850 | 869 |

The ternary alloy compositions of the Examples 1 to 12 showed liquidus temperature not higher than approximately 825° C., specifically, ranging from approximately 809° C. to approximately 825° C. These temperatures are remarkably lower than those of Comparative Examples 1 to 8. The composition having the lowest liquidus temperature among the Examples was $Zr_{50}Ti_{26}Ni_{24}$ of Example 6.

It should be noted that the Examples 1 to 12 and Comparative Examples 1 to 7 have a solidus temperature ranging from approximately 796° C. to approximately 799° C., except for Comparative Example 8. This implies that their solidus temperature is closely related to the Ni content. In other words, when the Ni content was not more than approximately 30 at %, the solidus temperature of approximately 850° C. dropped drastically to a temperature lower than 800° C. This result proves that the alloy composition of the Comparative Example 8 and the alloy compositions of the Examples 1 to 12 and the Comparative Examples 1 to 7 belong to different eutectic systems.

Since the alloy composition of the Comparative Example 8, whose Ni content is approximately 33.3%, belongs to a pseudo binary $Zr_2Ni$—$(Zr,Ti)_2Ni$ eutectic system, which is already known, it has a high solidus temperature of approximately 850° C. Since the alloy compositions of the Examples 1 to 12 and the Comparative Examples 1 to 7 whose Ni content is not more than approximately 30 at % belongs to a pseudo ternary eutectic system of $Zr(Ti)$ solid solution phase, $Zr_2Ni$ phase, and $(Zr,Ti)_2Ni$ phase, they have a low solidus temperature lower than approximately 800° C.

Experimental Example 1

DTA of Ternary Alloy Composition According to the Present Invention

Differential thermal analysis (DTA) was performed on the $Zr_{50}Ti_{26}Ni_{24}$ alloy composition of the Example 6 based on heating and cooling cycle and the result was presented in FIG. 5.

FIG. 5 shows that only a single endothermic and exothermic peak appeared in the heating and cooling cycle, respectively, and the temperature difference ($\Delta T$) between the peaks was as narrow as 11° C.

This result showed that the alloy composition of the Example 6 is the deepest eutectic point among the Zr—Ti—Ni ternary alloy compositions of the present invention.

Experimental Example 2

Observation of Microstructures of Ternary Alloy Compositions of the Present Invention and Alloy Compositions of the Comparative Examples and Comparison of their Constituent Phases Samples were prepared by re-melting the $Zr_{50}Ti_{26}Ni_{24}$ alloy composition of the Example 6 and $Zr_{43.9}Ti_{22.8}Ni_{33.3}$ alloy composition, which is an alloy composition at a pseudo eutectic point between a $Zr_2Ni$ phase and $(Zr,Ti)_2Ni$ phase of Comparative Example 8 illustrated in FIG. 4 re-melted and slowly solidified at a rate of 1° C./min in a vacuum furnace. FIGS. 7 (a) and 7(b) show Scanning Electron Microscope (SEM) images of the microstructure of the acquired samples.

As shown in FIG. 7(a), the alloy composition of the Example 6 has a typical eutectic structure formed of three constituent phases. Also, composition and crystal structure analysis using an X-ray diffraction (XRD) and a Transmission Electron Microscope (TEM) confirmed that the three phases were an $\alpha$-$Zr(Ti)$ solid solution phase (hcp), $Zr_2Ni$ phase (bct), and $(Zr,Ti)_2Ni$ phase (hcp) at room temperature.

Meanwhile, as shown in FIG. 7(b), the microstructure of the alloy composition of the Example 8 exhibited a typical eutectic structure formed of two constituent phases. The composition and crystal structure analysis using the XRD analysis of FIG. 4 and a TEM analysis revealed that the two constituent phases were $Zr_2(Ni)$ phase (bct) and $(Zr,Ti)_2Ni$ phase (hcp).

Examples 13 to 56

Zr—Ti—Ni—Cu Quaternary Alloy

The following Table 2 shows compositions of Zr—Ti—Ni—Cu quaternary alloys prepared according to Examples 13 to 56 of the present invention and Comparative Examples 9 to 24, their constituent phases analyzed through X-ray diffraction, and their solidus temperature and liquidus temperature obtained through differential thermal analysis.

TABLE 2

| Examples | Composition (at %) | | | | Cu/(Ni + Cu) | Constituent Phase | | | | Solidus Temperature ($T_s$, °C.) | Liquidus Temperature ($T_l$, °C.) |
|---|---|---|---|---|---|---|---|---|---|---|---|
| | Zr | Ti | Ni | Cu | | $Zr_2Ni$ | $(Zr,Ti)_2Ni$ | $Zr(Ti)$ | $Zr_2Cu$ | | |
| Example 13 | 60 | 21 | 13 | 6 | 0.31 | √ | √ | √ | — | 775 | 800 |
| Example 14 | 57 | 24 | 13 | 6 | 0.31 | √ | √ | √ | — | 774 | 791 |
| Example 15 | 56 | 25 | 13 | 6 | 0.31 | √ | √ | √ | — | 775 | 789 |
| Example 16 | 53 | 28 | 13 | 6 | 0.31 | √ | √ | √ | — | 775 | 800 |
| Example 17 | 60 | 20 | 13 | 7 | 0.35 | √ | √ | √ | — | 773 | 803 |
| Example 18 | 59 | 21 | 13 | 7 | 0.35 | √ | √ | √ | — | 775 | 792 |
| Example 19 | 55 | 25 | 13 | 7 | 0.35 | √ | √ | √ | — | 773 | 785 |
| Example 20 | 58 | 21 | 14 | 7 | 0.33 | √ | √ | √ | — | 775 | 786 |
| Example 21 | 54 | 25 | 14 | 7 | 0.33 | √ | √ | √ | — | 773 | 795 |
| Example 22 | 57 | 21 | 14 | 8 | 0.36 | √ | √ | √ | — | 774 | 785 |
| Example 23 | 55 | 23 | 14 | 8 | 0.36 | √ | √ | √ | — | 772 | 793 |
| Example 24 | 53 | 25 | 14 | 8 | 0.36 | √ | √ | √ | — | 774 | 796 |
| Example 25 | 55 | 22 | 20 | 3 | 0.13 | √ | √ | √ | — | 789 | 798 |
| Example 26 | 55 | 22 | 17 | 6 | 0.26 | √ | √ | √ | — | 776 | 785 |
| Example 27 | 55 | 22 | 13 | 10 | 0.43 | √ | √ | √ | — | 775 | 788 |
| Example 28 | 55 | 22 | 15 | 8 | 0.34 | √ | √ | √ | — | 773 | 785 |
| Example 29 | 54 | 23 | 15 | 8 | 0.34 | √ | √ | √ | — | 774 | 786 |
| Example 30 | 55 | 21 | 15 | 9 | 0.37 | √ | √ | √ | — | 774 | 785 |
| Example 31 | 54 | 22 | 15 | 9 | 0.37 | √ | √ | √ | — | 772 | 787 |
| Example 32 | 54 | 22 | 18 | 6 | 0.25 | √ | √ | √ | — | 778 | 790 |
| Example 33 | 54 | 22 | 16 | 8 | 0.33 | √ | √ | √ | — | 773 | 784 |
| Example 34 | 53 | 23 | 15 | 9 | 0.37 | √ | √ | √ | — | 774 | 787 |
| Example 35 | 52 | 24 | 21 | 3 | 0.12 | √ | √ | √ | — | 788 | 800 |
| Example 36 | 50 | 26 | 21 | 3 | 0.12 | √ | √ | √ | — | 788 | 806 |
| Example 37 | 56 | 20 | 16 | 8 | 0.33 | √ | √ | √ | — | 773 | 805 |
| Example 38 | 55 | 21 | 16 | 8 | 0.33 | √ | √ | √ | — | 774 | 784 |
| Example 39 | 54 | 22 | 16 | 8 | 0.33 | √ | √ | √ | — | 774 | 783 |
| Example 40 | 52 | 24 | 16 | 8 | 0.33 | √ | √ | √ | — | 773 | 793 |
| Example 41 | 51 | 25 | 16 | 8 | 0.33 | √ | √ | √ | — | 774 | 797 |
| Example 42 | 50 | 26 | 16 | 8 | 0.33 | √ | √ | √ | — | 773 | 807 |
| Example 43 | 48 | 28 | 16 | 8 | 0.33 | √ | √ | √ | — | 773 | 809 |
| Example 44 | 54 | 22 | 12 | 12 | 0.50 | √ | √ | √ | — | 775 | 802 |
| Example 45 | 52 | 24 | 12 | 12 | 0.50 | √ | √ | √ | — | 780 | 809 |
| Example 46 | 50 | 26 | 12 | 12 | 0.50 | — | √ | √ | √ | 792 | 809 |
| Example 47 | 48 | 28 | 12 | 12 | 0.50 | — | √ | √ | √ | 790 | 808 |
| Example 48 | 55 | 20 | 16 | 9 | 0.36 | √ | √ | √ | — | 773 | 799 |
| Example 49 | 54 | 21 | 16 | 9 | 0.36 | √ | √ | √ | — | 774 | 784 |
| Example 50 | 54 | 21 | 17 | 8 | 0.32 | √ | √ | √ | — | 774 | 784 |
| Example 51 | 53 | 22 | 15 | 10 | 0.40 | √ | √ | √ | — | 773 | 796 |
| Example 52 | 51 | 24 | 15 | 10 | 0.40 | √ | √ | √ | — | 773 | 791 |
| Example 53 | 50 | 25 | 17 | 8 | 0.32 | √ | √ | √ | — | 774 | 800 |
| Example 54 | 52 | 20 | 18 | 10 | 0.35 | √ | √ | √ | — | 772 | 794 |
| Example 55 | 48 | 22 | 18 | 12 | 0.26 | √ | √ | √ | — | 773 | 808 |
| Example 56 | 50 | 20 | 18 | 12 | 0.33 | √ | √ | √ | — | 773 | 807 |
| Comparative Example 9 | 56 | 27 | 9 | 8 | 0.47 | √ | √ | √ | — | 775 | 825 |
| Comparative Example 10 | 63 | 20 | 9 | 8 | 0.47 | √ | √ | √ | — | 775 | 823 |
| Comparative Example 11 | 48 | 32 | 12 | 8 | 0.40 | √ | √ | √ | — | 774 | 830 |
| Comparative Example 12 | 65 | 15 | 10 | 10 | 0.50 | √ | √ | √ | — | 790 | 856 |
| Comparative Example 13 | 58 | 18 | 21 | 3 | 0.12 | √ | √ | √ | — | 788 | 846 |
| Comparative Example 14 | 46 | 30 | 21 | 3 | 0.12 | √ | √ | √ | — | 787 | 828 |
| Comparative Example 15 | 46 | 30 | 16 | 8 | 0.33 | √ | √ | √ | — | 774 | 819 |
| Comparative Example 16 | 58 | 18 | 12 | 12 | 0.50 | √ | √ | √ | — | 775 | 837 |
| Comparative Example 17 | 58 | 18 | 8 | 16 | 0.66 | √ | √ | √ | — | 782 | 872 |
| Comparative Example 18 | 52 | 24 | 8 | 16 | 0.66 | — | √ | √ | √ | 797 | 849 |
| Comparative Example 19 | 48 | 28 | 8 | 16 | 0.66 | — | √ | √ | √ | 803 | 830 |
| Comparative Example 20 | 60 | 15 | 15 | 10 | 0.40 | √ | √ | √ | — | 771 | 828 |
| Comparative Example 21 | 46 | 25 | 21 | 8 | 0.27 | √ | √ | √ | — | 773 | 825 |
| Comparative Example 22 | 55 | 15 | 20 | 10 | 0.33 | √ | √ | √ | — | 772 | 853 |

TABLE 2-continued

| Examples | Composition (at %) | | | | Cu/ (Ni + Cu) | Constituent Phase | | | | Solidus Temperature ($T_s$, °C.) | Liquidus Temperature ($T_L$, °C.) |
| --- | --- | --- | --- | --- | --- | --- | --- | --- | --- | --- | --- |
| | Zr | Ti | Ni | Cu | | $Zr_2Ni$ | $(Zr,Ti)_2Ni$ | Zr(Ti) | $Zr_2Cu$ | | |
| Comparative Example 23 | 45 | 22 | 18 | 15 | 0.44 | √ | √ | — | √ | 800 | 840 |
| Comparative Example 24 | 50 | 16.5 | 18.5 | 15 | 0.46 | √ | √ | — | √ | 799 | 819 |

The Zr—Ti—Ni—Cu quaternary alloy compositions of the present invention prepared according to the Examples 13 to 56 had a liquidus temperature under approximately 809° C. ranging from approximately 783° C. to approximately 809° C., which is considerably lower than those of the alloy compositions prepared according to the Comparative Examples 9 to 24. Among the alloy compositions of the Examples, $Zr_{54}Ti_{22}Ni_{16}Cu_8$ alloy of the Example 39 showed the lowest liquidus temperature, which was 783° C.

Referring to the Table 2 and the following Experimental Example 4, the quaternary alloys of the present invention were acquired by solidly dissolving Cu in the ternary alloy compositions of the present invention. Thus, it can be seen that the quaternary alloys includes a constituent phase of Zr(Ti) solid solution phase (hcp) with Cu dissolved therein, $Zr_2Ni$ phase (bct) with Cu dissolved therein, and $(Zr,Ti)_2Ni$ phase (hcp) with Cu dissolved therein, or a constituent phase of Zr(Ti) solid solution phase (hcp) with Cu dissolved therein, $Zr_2Cu$ phase (bct) with Ni dissolved therein, and $(Zr,Ti)_2Ni$ phase (hcp) with Cu dissolved therein.

A study, entitled "Non-Crystalline Solids," Vol. 250-252, 1999, pp. 560-565, reports that $Zr_{50}Ti_{16.5}Ni_{18.5}Cu_{15}$ alloy composition of Comparative Example 24 has three constituent phases: $Zr_2Ni$ (bct), $(Zr,Ti)_2Ni$ (hcp), and $Zr_2Cu$ (bct). The alloy composition of the Comparative Example 24 has a significant difference from the alloy compositions of the present invention in that it does not include Zr(Ti) solid solution phase. When the total amount of Ni and Cu (Ni+Cu) is not more than approximately 30 at %, the quaternary alloy compositions of the present invention and the alloy compositions of the Comparative Examples included Zr(Ti) solid solution phase as their constituent phase. Therefore, when the value obtained by summing the Ni content and the Cu content exceeds 30 at % as shown in the Comparative Examples 23 and 24, the constituent phase did not include Zr(Ti) solid solution phase. Thus their solidus temperature and liquidus temperature were decided to be high. When the ternary alloy compositions of the present invention including Ni not more than approximately 30 at %, a new type of eutectic alloy including the Zr(Ti) solid solution phase is formed, which leads to descending solidus temperature and liquidus temperature.

To be specific, referring to the Table 2, the constituent phases of the quaternary alloy compositions prepared according to the present invention included Zr(Ti) solid solution phase (hcp) with Cu dissolved therein, $Zr_2Ni$ phase (bct) with Cu dissolved therein, and $(Zr,Ti)_2Ni$ phase (hcp) with Cu dissolved therein, or they included Zr(Ti) solid solution phase (hcp) with Cu dissolved therein, $Zr_2Ni$ phase (bct) with Ni dissolved therein, and $(Zr,Ti)_2Ni$ phase (hcp) with Cu dissolved therein. In short, the quaternary alloy compositions of the present invention are considered to have low solidus temperature not higher than approximately 792° C. due to the presence of Zr(Ti) solid solution and dissolution of Cu in each constituent phase. This solidus temperature is more than 8° C. lower than those of the Comparative Examples 23 and 24, which are as high as approximately 800° C.

Meanwhile, as the content of Cu in the Examples 46 and 47 is higher than those of the other examples, this results in the formation of the $Zr_2Cu$ (bct), raising the solidus temperature somewhat higher than the compositions of the other Examples. Since the alloy compositions of the Examples 46 and 47 also included the Zr(Ti) solid solution phase, just as the other Examples do, it can be seen that they have relatively lower solidus and liquidus temperatures than those of the Comparative Examples. When the content of Cu exceeded approximately 12 at %, the liquidus was increased drastically, which is shown in the Comparative Examples 17 to 19, 23 and 24.

Experimental Example 3

DTA of Quaternary Alloy Compositions According to the Present Invention

Differential thermal analysis was carried out to the $Zr_{54}Ti_{22}Ni_{16}Cu_8$ of the Example 39 according to heating and cooling. The result was as shown in FIG. 6.

FIG. 6 shows that only a single endothermic and exothermic peak appeared in the heating curve and the cooling curve, respectively, and the temperature difference (ΔT) between the peaks was as narrow as 9° C. This result shows that the alloy composition of the Example 39 had the deepest eutectic point among the Zr—Ti—Ni—Cu quaternary alloy compositions prepared according to the present invention.

Experimental Example 4

Figure 8:
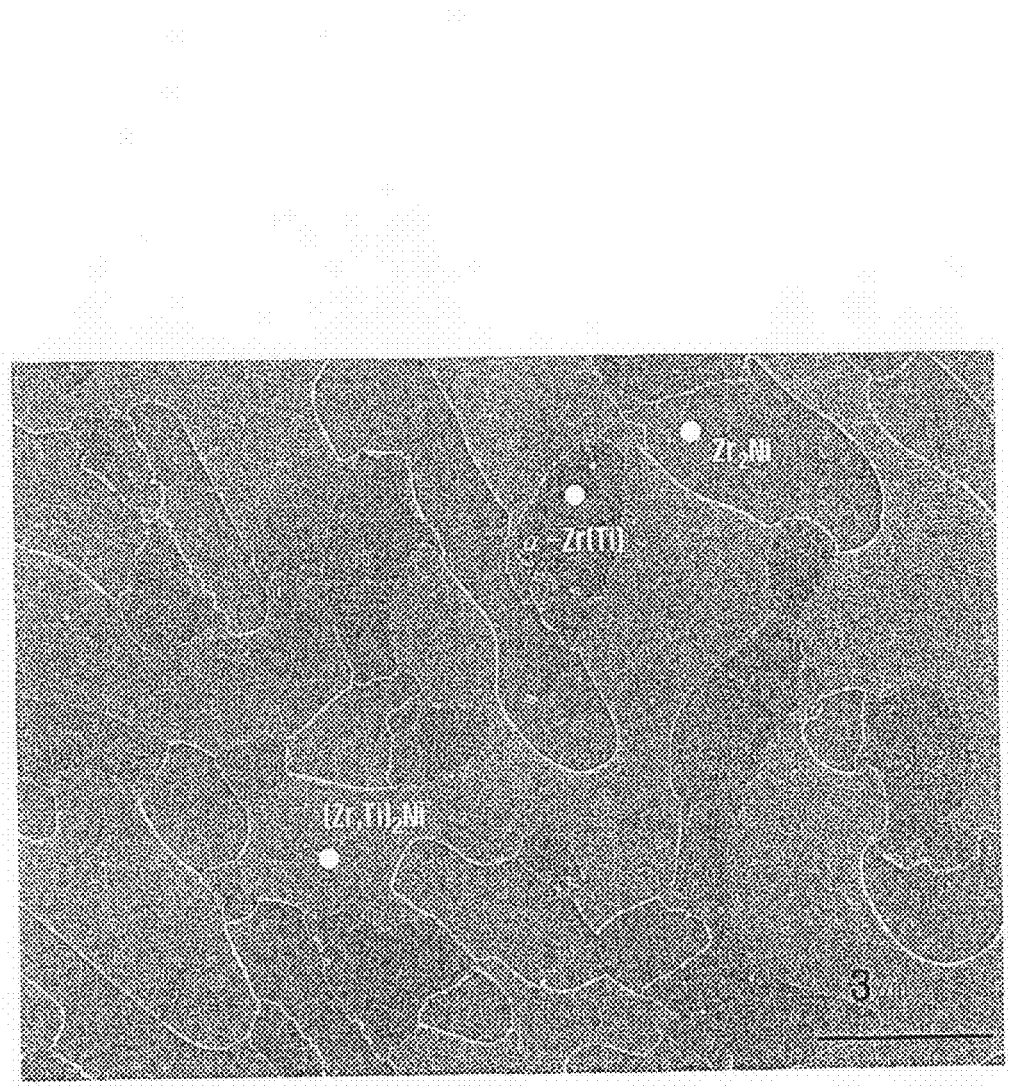
FIG. 8 is a SEM image of $Zr_{54}Ti_{22}Ni_{16}Cu_8$ alloy composition of Example 39 according to Experimental Example 4.

Observation of Microstructure of Quaternary Alloy Compositions of the Present Invention and Comparison of Constituent Phases The $Zr_{54}Ti_{22}Ni_{16}Cu_8$ alloy composition of the Example 39 was re-melted at a temperature over its melting point in vacuum and slowly solidified at a rate of 1° C./min to thereby produce a sample. FIG. 8 shows Scanning Electron Microscophic (SEM) images of the sample.

As shown in FIG. 8, the alloy composition of the Example 39 had a typical eutectic structure including three constituent phases. Composition and crystalline structure analysis through XRD and TEM revealed that the three constituent phases were Zr(Ti) solid solution phase (hcp) including Cu dissolved therein, $Zr_2Ni$ phase (bct) with Cu dissolved therein, and $(Zr,Ti)_2Ni$ phase (hcp) with Cu dissolved therein at room temperature. The three constituent phases included Cu up to its solubility limit, and there was no change in the type of constituent phases in comparison with ternary alloy composition of the present invention.

Experimental Example 5

Figure 9:
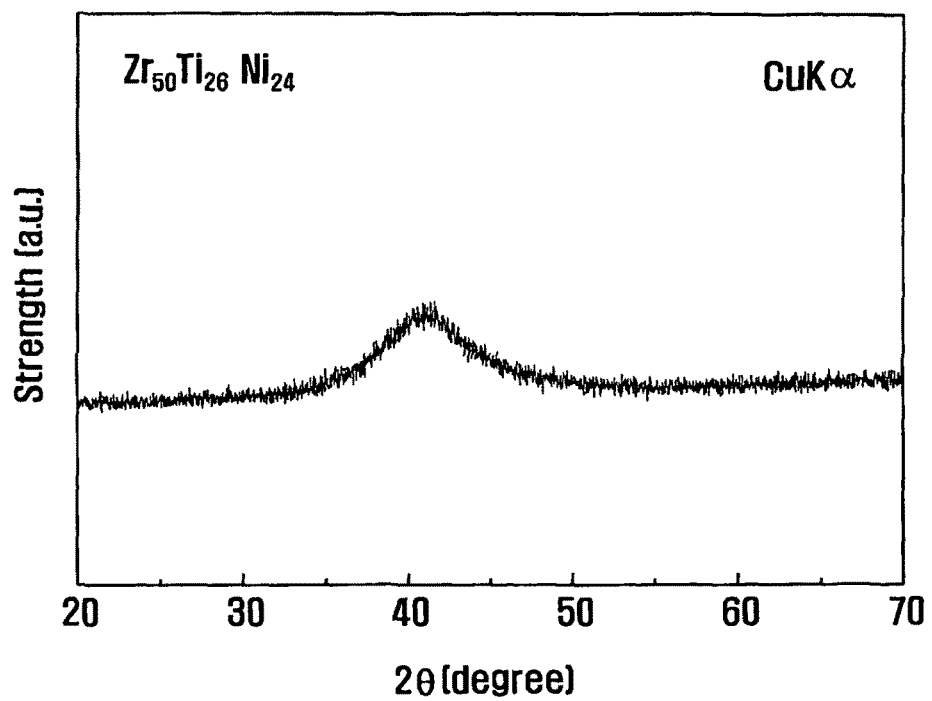
FIG. 9 is a graph showing an X-ray Diffraction (XRD) analysis result of $Zr_{50}Ti_{26}Ni_{24}$ alloy composition of Example 6 prepared through melt-spinning according to Experimental Example 5.
Figure 10:
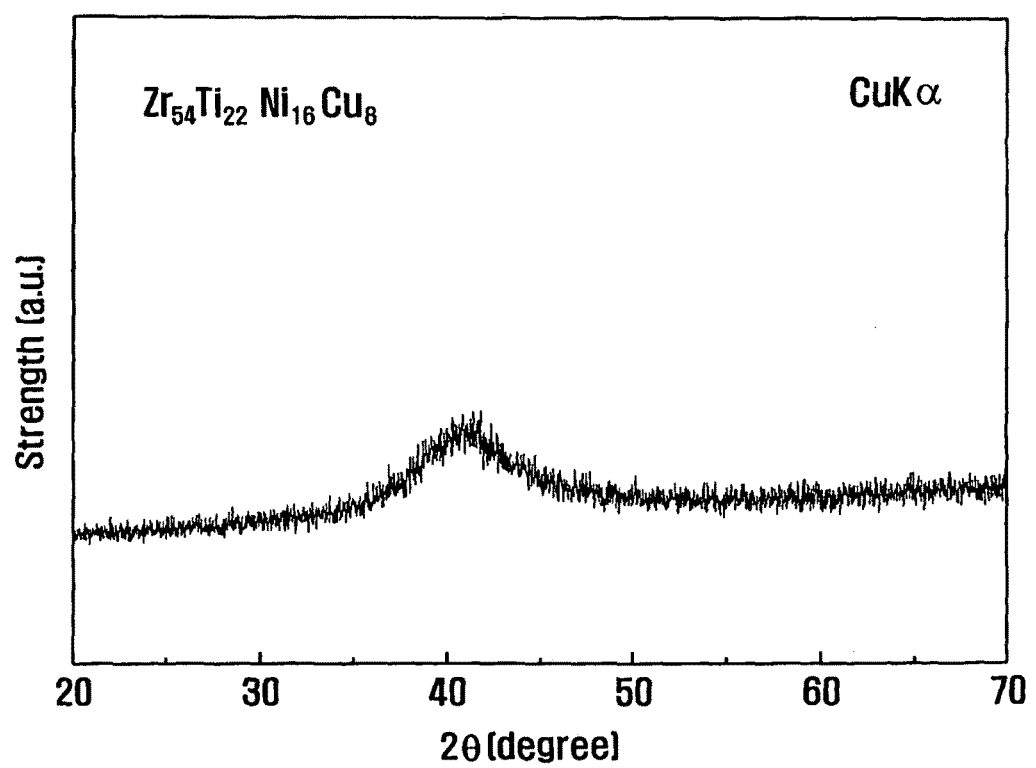
FIG. 10 is an XRD analysis result of $Zr_{54}Ti_{22}Ni_{16}Cu_8$ alloy composition of Example 39 prepared through melt-spinning according to Experimental Example 5.

XRD Analysis of Ternary and Quaternary Alloy Compositions Prepared Through Melt-Spinning According to the Present Invention XRD analysis was performed onto samples prepared by melt-spinning ternary and quaternary alloy compositions of the present invention in the form of foil. The results were presented in FIGS. 9 and 10, respectively. FIGS. 9 and 10 showed that the ternary and quaternary alloy compositions of the present invention had a glass forming ability that was proved by diffuse hallow pattern from XRD analysis due to their amorphous structure, and they were easily formed into amorphous foil through the melt-spinning.

Experimental Example 6

Tensile Strength Test at Room Temperature Based on Brazing Heat Cycle of Joint Body Using Alloy Composition of the Present Invention as Filler Alloy A joint body was manufactured using Ti-6Al-4V having strength of approximately 1040 MPa as base metal and the $Zr_{54}Ti_{22}Ni_{16}Cu_8$ alloy composition of the Example 39 as filler alloy and brazing them at a joining temperature of approximately 800° C. to approximately 950° C. for 60 minutes. Also, tensile strengths of the base metal (Ti-6Al-4V) without joint were tested at room temperature after exposing only the base metal to the same brazing heat cycle.

Figure 11:
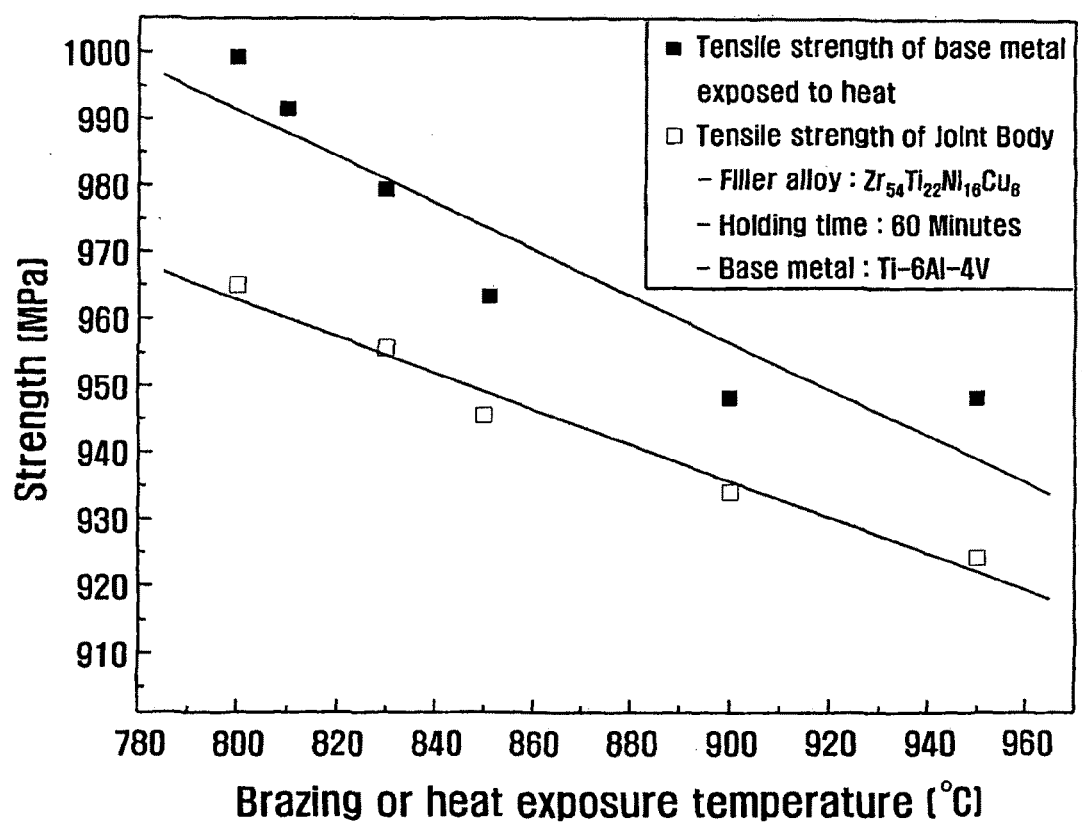
FIG. 11 is a graph showing tensile strengths of a base metal and a joint body using an alloy composition according to Experimental Example 6 at room temperature.

The tensile strengths of the joint body and the base metal at room temperature obtained from the test are presented in FIG. 11. In FIG. 11, the tensile strength of the base metal is the maximum tensile strength and the tensile strength of the joint body is rupture strength. FIG. 11 shows that the higher the heat cycle temperature becomes, the lower the maximum tensile strength of the base metal grows. Thus, the tensile strength of the joint body is decreased, too. The tensile rupture of the joint body occurred at a joint under all joining conditions. According to the test result, when the brazing temperature was high, the strength of the base metal was decreased and the joining strength became low, too. The joint strength of the joint body brazed at approximately 800° C., which is the lowest temperature, is 965 MPa, which is the closest to the strength (1040 MPa) of the base metal before the thermal exposure.

Consequently, the present invention lowers the brazing temperature to approximately 800° C. by using a filler alloy having a low melting point, minimizes a decrease in the mechanical properties of Ti base metal and maximizes the mechanical characteristic of the joint body from the brazing heat cycle.

What is claimed is:

1. A Zr—Ti—Ni—Cu quaternary alloy composition, expressed as:

$$Zr_aTi_bNi_cCu_d \qquad \text{Formula 2}$$

where a, b, c and d denote atomic % of Zr, Ti, Ni and Cu respectively; $48 \leq a \leq 60$; $20 \leq b \leq 28$; $19 \leq c+d \leq 30$; $3 \leq d \leq 12$; and $0.12 \leq d/(c+d) \leq 0.5$, wherein constituent phase of the alloy composition at room temperature includes three phases, which are $Zr_2Ni$ phase with Cu dissolved therein, $(Zr,Ti)_2Ni$ phase with Cu dissolved therein, and Zr(Ti) solid solution phase with Cu dissolved therein, or which are $Zr_2Cu$ phase with Ni dissolved therein, $(Zr,Ti)_2Ni$ phase with Cu dissolved therein, and Zr(Ti) solid solution phase with Cu dissolved therein.

2. The Zr—Ti—Ni—Cu quaternary alloy composition of claim 1, wherein liquidus temperature of the alloy composition ranges from approximately 783° C. to approximately 809° C.

3. The Zr—Ti—Ni—Cu quaternary alloy composition of claim 1, wherein solidus temperature of the alloy composition ranges from approximately 772° C. to approximately 792° C.

* * * * *